No. 642,050. Patented Jan. 23, 1900.
G. W. MURRAY.
COTTON SEED PLANTER.
(Application filed Feb. 14, 1898. Renewed Dec. 12, 1899.)
(No Model.) 2 Sheets—Sheet 1.
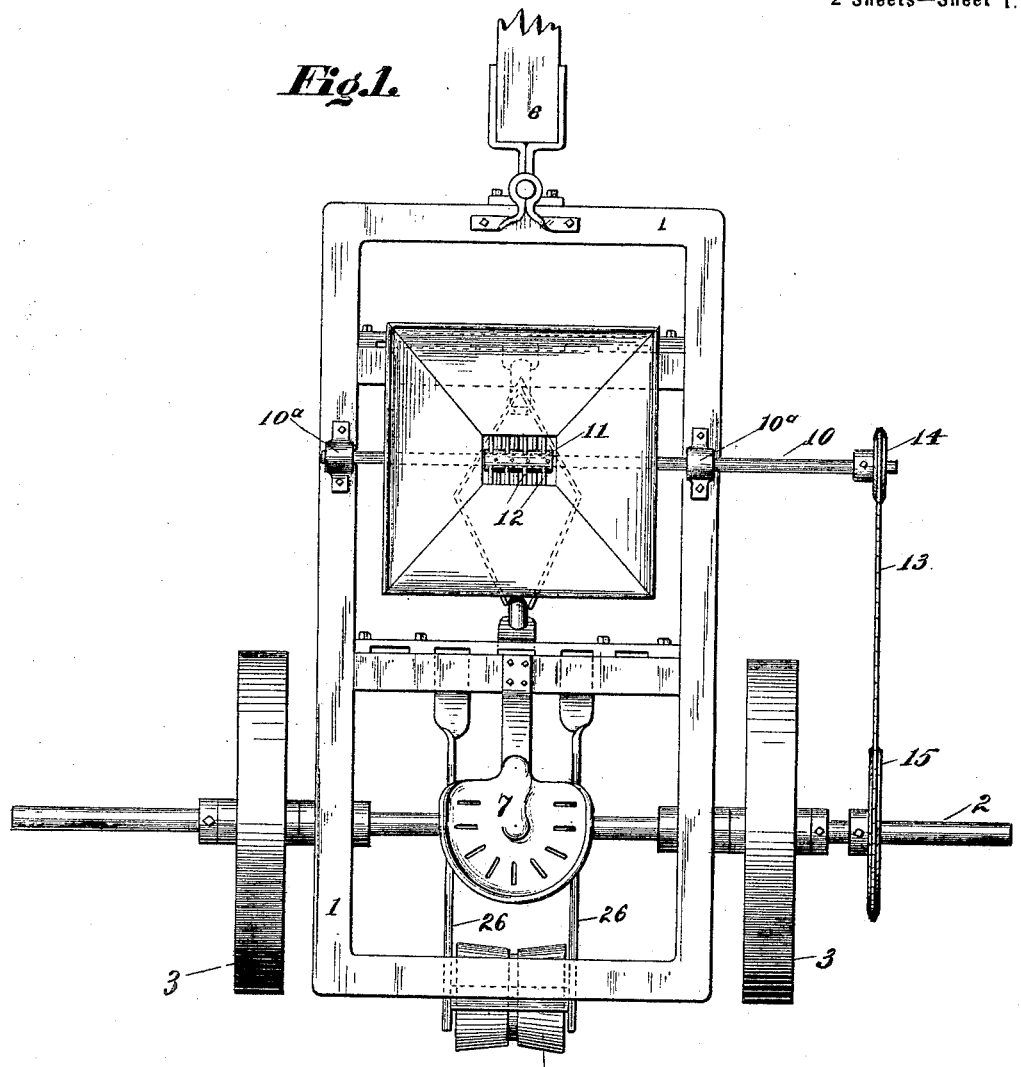
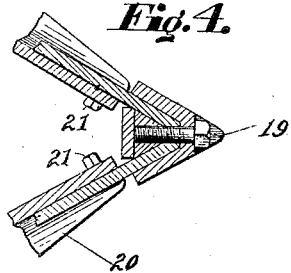
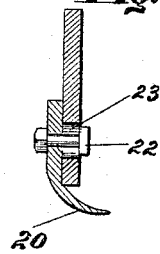
Attest:
Edw. L. Dillon
A. Sims.
Inventor:
Geo. W. Murray
By Malcolm G. Ellis
Atty
THE NORRIS PETERS CO., PHOTO-LITHO., WASHINGTON, D. C.

No. 642,050. Patented Jan. 23, 1900.
G. W. MURRAY.
COTTON SEED PLANTER.
(Application filed Feb. 14, 1898. Renewed Dec. 12, 1899.)

(No Model.) 2 Sheets—Sheet 2.

Attest:
Edw. L. Dillon
A. Sims.

Inventor:
Geo. W. Murray
By Halcolm J. Ellis
Atty.

UNITED STATES PATENT OFFICE.

GEORGE W. MURRAY, OF SUMTER, SOUTH CAROLINA.

COTTON-SEED PLANTER.

SPECIFICATION forming part of Letters Patent No. 642,050, dated January 23, 1900.

Application filed February 14, 1898. Renewed December 12, 1899. Serial No. 740,115. (No model.)

*To all whom it may concern:*

Be it known that I, GEORGE W. MURRAY, a citizen of the United States, residing at Sumter, Sumter county, State of South Carolina, have invented a new and useful Improvement in Cotton-Seed Planters, of which the following is a full, clear, and exact description.

This invention relates to improvements in cotton-seed planters, the object being to produce a machine of simple and cheap construction, light in weight, and inexpensive, together with other features of novelty, which will be more clearly set forth in the following specification and claim, together with the drawings which are made a part of this application.

Figure 2:
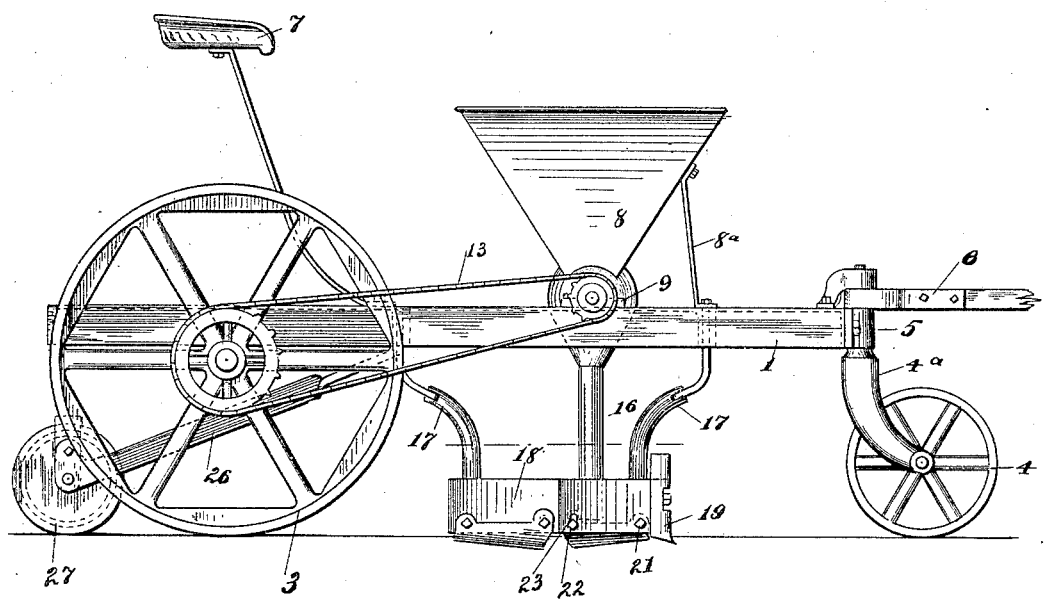
Figure 3:
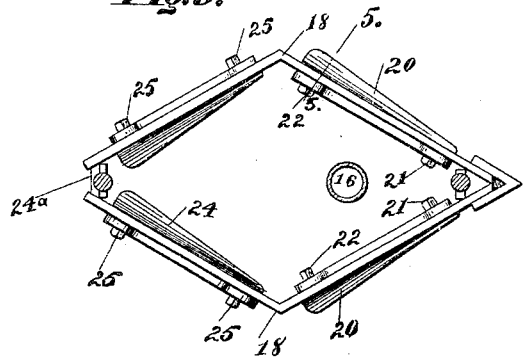

Figure 1 is a top view or plan of the machine. Fig. 2 is a side elevation. Fig. 3 is a top view of the diamond-shaped cultivator. Fig. 4 is a detail view of the front point of the diamond-shaped cultivator. Fig. 5 is a cross-section through one of the side plates of the diamond-shaped cultivator.

The machine consists, essentially, of a horizontal frame 1 of a rectangular or other desired pattern. On the under side of the frame 1 and journaled thereto is a shaft 2, on which the wheels 3 are mounted. A caster-wheel 4 supports the front end of the machine, the same being mounted in a fork 4ª, the shaft of which passes through a vertical journal 5, secured to the front end of the frame 1. A tongue 6, secured to the shaft of the fork 4ª, serves for drawing and guiding the machine. A seat 7, of the type usually employed on this class of machinery, is mounted on the frame 1 in the customary manner. Above the frame 1 is secured a hopper 8, in which the seed is placed. This hopper 8 is secured to the frame 1 and supported by a brace 8ª. The lower end of the hopper terminates and opens into a cylindrical chamber 9. Through the center of this cylindrical chamber a horizontal shaft 10 passes, the said shaft 10 being mounted in journals 10ª, secured to the sides of the frame 1. Within the cylindrical chamber 9 a hub 11 is mounted on the shaft 10, and from the hub 11 project a series of fingers or spikes 12, which serve to agitate and separate the cotton-seed when the shaft 10 is rotated. This rotation is accomplished by means of the sprocket-chain 13, which connects the driving-shaft with the shaft 10 through means of the sprocket-wheels 14, mounted on the shaft 10, and the sprocket-wheel 15, mounted on shaft 2. An orifice in the lower side of the cylindrical chamber 9 opens into the upper end of the dropping-tube 16, which carries the seed down to the ground at the desired point.

Suspended from the frame 1 by metal bars 17 is a cultivator of peculiar pattern consisting of a diamond-shaped frame 18, the sides of which are four vertical plates rigidly secured together. At the front end of the diamond-shaped frame there is a vertically-adjustable point, which serves the purpose of making the opening furrow as the machine is drawn forward. Secured to the back side of the two forward plates of the diamond-shaped frame 18 are adjustable blades 20, which pass underneath the bottom of the diamond-shaped frame 18. These adjustable blades 20 are pivoted at their forward extremity by bolts 21 and are held at their rear end by bolts 22. The rear end of the plates 20 may be raised or lowered, the bolts 22 sliding up or down in the slot 23. In this way the rear ends of the blades 20 are adjustable. Secured to the outside of the two rear plates of the diamond-shaped frame 18 are the blades 24, which extend down and pass under the bottom of the diamond-shaped frame 18, the curved part of the blade extending to the inside of the diamond-shaped frame 18 instead of to the outside, as in case of the blades 20. These blades 24 are secured to the diamond-shaped frame 18 by bolts 25. Extending from the frame 1 in a backward direction are the bars 26, which serve to hold the roller 27 in position, which is directly back of the center of the diamond-shaped frame 18.

The operation of the machine is as follows: The vertically-adjustable point 19 is set at the desired elevation or depression. The forward movement of the machine causes the point 19 to enter the ground, making the furrow, the earth being separated to the right and left by the two forward sides of the diamond-shaped frame 18 and the blades 20, the driving-wheel rotating the sprocket-wheel 15 and through the chain 13 the sprocket-wheel 14, which in turn rotates the shaft 10 and the hub 11 within the cylindrical chamber 9. This causes the cotton-seed to be turned from the hopper 8 and dropped into the tube 16, which delivers the seed on the ground in the furrow just made by the point 19. The inturned blades 24 are so arranged that they project deepest into the ground at their forward ends. From this it will be seen as the machine moves forward they will scoop up the earth from the sides and gather it together in the center, and inasmuch as the two blades 24 do not meet at the back and there is an opening 24ª between the two rear sides of the diamond-shaped frame 18. a little mound or ridge of earth will be formed covering the seed just deposited. The roller 27, following in the wake of the diamond-shaped frame 18, serves to press down this little ridge or mound of earth firmly over the seed.

Suitable draft appliances may be located at the front end of the machine, and the height of the diamond-shaped cultivator may be regulated by the bars 17 where they are attached to the frame 1.

Having described my invention, I claim—

The combination in a cotton-seed planter of a frame 1 mounted on wheels 3, a diamond-shaped cultivator 18, provided with outward-curved blades 20, on the forward sides of the cultivator, and inward-curved blades 24 on the rearward sides of the cultivator, and means for dropping the cotton-seed within the cultivator, substantially as described.

GEO. W. MURRAY.

Witnesses:
W. McKINLAY,
E. G. NALLE.